Figure 1:
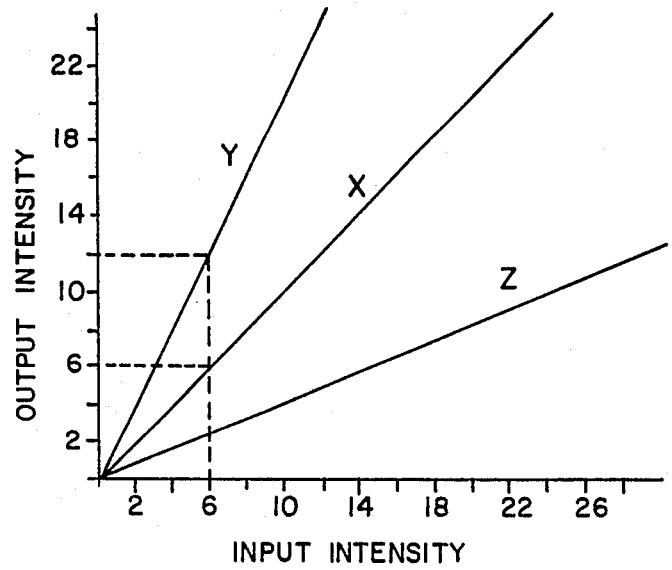

United States Patent [19]

Kermisch

[11] Patent Number: 4,751,503
[45] Date of Patent: Jun. 14, 1988

[54] IMAGE PROCESSING METHOD WITH IMPROVED DIGITAL AIRBRUSH TOUCH UP

[75] Inventor: Dorian Kermisch, Penfield, N.Y.

[73] Assignee: Xerox Corporation, Stamford, Conn.

[21] Appl. No.: 685,359

[22] Filed: Dec. 24, 1984

[51] Int. Cl.⁴ .............................................. G09B 1/16
[52] U.S. Cl. .................... 340/709; 340/723; 340/703
[58] Field of Search .............. 340/703, 709, 710, 723; 364/521

[56] References Cited

U.S. PATENT DOCUMENTS

| | | | |
|---|---|---|---|
| 3,846,826 | 11/1974 | Mueller | 340/703 |
| 3,892,963 | 7/1975 | Hawley et al. | 250/231 R |
| 3,898,377 | 8/1975 | Fairbairn et al. | 178/6 |
| 3,911,419 | 10/1975 | Bates et al. | 340/709 |
| 4,103,330 | 7/1978 | Thacker | 364/200 |
| 4,103,331 | 7/1978 | Thacker | 364/200 |
| 4,148,098 | 4/1979 | McCreight et al. | 364/200 |
| 4,317,956 | 3/1984 | Torok | 340/709 |
| 4,345,313 | 8/1984 | Knox | 364/515 |
| 4,438,453 | 3/1984 | Alston | 340/703 |
| 4,514,818 | 4/1985 | Walker | 340/710 |

*Primary Examiner*—Marshall M. Curtis
*Attorney, Agent, or Firm*—Ronald F. Chapuran

[57] ABSTRACT

The present invention is a technique for changing the contrast in a limited area of a digital image having a plurality of pixels of differing tone levels and at the same time maintaining a constant average level intensity of the pixels within the limited area by isolating a portion of the pixels and selectively altering the contrast of tone levels between pixels.

8 Claims, 4 Drawing Sheets

IMAGE PROCESSING METHOD WITH IMPROVED DIGITAL AIRBRUSH TOUCH UP

This invention relates to electrica image processing systems. Specifically, this invention relates to a method and apparatus for touching up an electronic, continuous tone image by changing image contrast upon operator interaction with a visual representation of the image on a display screen.

The publishing industry, for one, employs high resolution optical scanners to generate electronic, continuous tone raster image signals representative of continuous tone originals such as photographs and graphic art work. The raster image signals are used in electronic plate making equipment to modulate a scanning laser beam, an electronic beam in a cathode ray tube (CRT) or the like to construct a facsimile of the continuous tone original on a suitable printing master. The content of an original must be in final form before the scanner generates the raster signals because presently known electronic plate making systems have limitd provisions for making changes to the electrical image like touch up by a graphic artist.

Typically, a touch up artist changes shading, changes tone levels, corrects color hue, and erases small, randomly located defects. A touch up artist also fills in erased regions, adds a script signature, adds detail by free hand, and makes notations on the original. The changes or touch ups made by the artist usually result in an original being refabricated before it is suitable to be optically scanned. This, of course, is costly and increases editorial difficulties when the time needed to make a change is not available. The editing or correction operation is particularly complex when the original includes three or four color separation images which all need to be corrected.

A tool called an "airbrush" is used in the graphic arts to do at least some touch up work. The airbrush is a spray gun about the size of a pencil with a nozzle at the tip. The gun is coupled to a positive air source to spray watercolor pigments and is used to correct or obtain a given tone or to graduate the tone between two regions of different tone. In the plate-making process, the airbrush is used to direct a stream of an abrasive-like pumice onto a plate to remove spots or other unwanted areas.

An electrical airbrush is significantly different from that used in the graphic arts but the name is borrowed because it tends to be a helpful functional descriptor. An electrical airbrush is a device that can be manipulated as if it were a brush by an operator viewing a CRT display, or similar display, to make corrections to an electrical raster image during real time interaction between the operator and the displayed image.

In operation, a memory device stores the electrical signals representative of an image sought to be corrected. The electrical image is made visible to an observer by applying the electrical signals to a display device. An airbrush tip image is created on the display over the visual image. The electrical airbrush includes a pointer device that is manipulated by the viewer to touch up the continuous tone image. The pointer modifies the tone of the displayed image when it is moved in a brush stoke fashion and a button on the pointer is depressed. The movement of the pointer causes a like movement of the airbrush tip image over the displayed image. The motion and button despression enable the operator to obtain image changes under the airbrush tip image with a stroking action like that of an artist working on a water color or oil painting.

In one embodiment, the pointer is activated by what is generally known as a mouse. The device includes a ball bearing which is rolled over a table top to generate positive signals that move the image of the brushtip over the visual image on the display. The pointer can also include in one embodiment, three buttons titled A, B and C. A viewer "touches up" an image by simultaneously rolling the pointer over the table top and depressing either the A or C button. The A button increases the tone level of the signals in the memory corresponding to the signals in the region of the airbrush tip. The C button decreases the tone level image signals in the region of the airbrush. The B button in the example under discussion, increases and decreases, respectively, the size of the image of the brushtip when it is depressed along with either the A or C button. It should be noted that other embodiments, such as hand held pointers are available and that the size of the tip can be varied.

Cursor and pointer devices used with image processing systems are well known. For example, the Xerox Alto computer system has a display device with a pointer and a cursor. Various U.S. patents describe various aspects of the Alto system including: U.S. Pat. Nos. 4,103,331 titled "Data Processing Display System;" 3,911,419 titled "Controller for Cursor Positioning on a Display Medium;" 3,892,963 titled "Transducer for a Display-Oriented Pointing Device;" 3,898,377 titled "Video Mixer;" 4,148,098 titled "Data Transfer System with Disk Command Verification Apparatus;" and 4,103,330 titled "Task Handling in a Data Processing Apparatus." The disclosures of these patents are hereby incorporated by reference.

The Sci-Tex North American Corporation has advertised a computer based system for color graphics under the trade name of Response-300. This system includes a pointer device for making corrections to a color image. It also speaks of having an airbrush capability. The Sci-Tex pointer replaces image data with a fixed density mark. The Sci-Tex system is a color system so the constant density mark that replaces existing image data has a constant color as well as a constant density.

It is also known, as taught in U.S. Pat. No. 4,345,313, assigned to the same assignee as the present invention, to modify rather than replace existing image data. In addition, U.S. Pat. No. 4,345,313 decribes the movement of the brush over the affected area thereby simulating the hand motion of an artist working with a graphic picture.

A difficulty with prior art systems is that the intensity levels can be changed by moving the levels up or down simultaneously, but it is not possible to change the contrast or gradient between two areas.

In contrast, the electrical airbrush of this invention enables a viewer to address any region of a continuous tone image in real time and, with the motion of the airbrush, touch up the tone by changing the contrast or gradient between two areas with only very small changes in the average local intensity (or density). It is an object of the present invention therefore, to provide a new and improved digital airbrush touch up technique in which it is possible to change local contrast of the image in real time.

Briefly, the present invention is a technique for changing the contrast in a limited area of a digital image having a plurality of pixels of differing tone levels and at the same time maintaining a constant average level intensity of the pixels within the limited area by isolating a portion of the pixels and selectively altering the contrast of tone levels between pixels.

For a better understanding of the present invention, reference may be had to the accompanying drawings wherein the same reference numerals have been applied to like parts and wherein:

FIG. 1 illustrates three linear reproduction curves.

FIG. 2(a)-2(g) are tone reproduction curves illustrating the present invention.

Figure 3A:
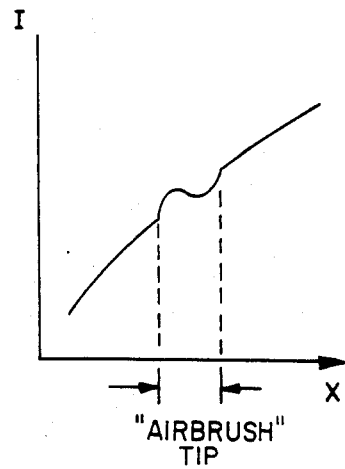
Figure 3B:
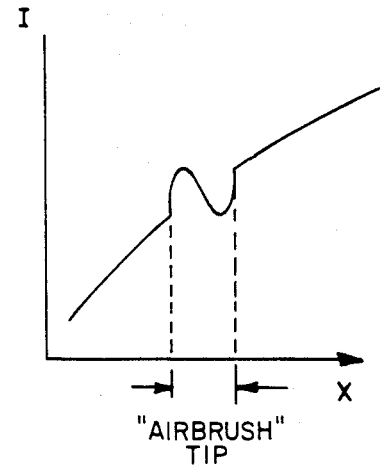

FIG. 3(a) and 3(b) illustrate a change in local detail of an image in accordance with the present invention.

Figure 4:
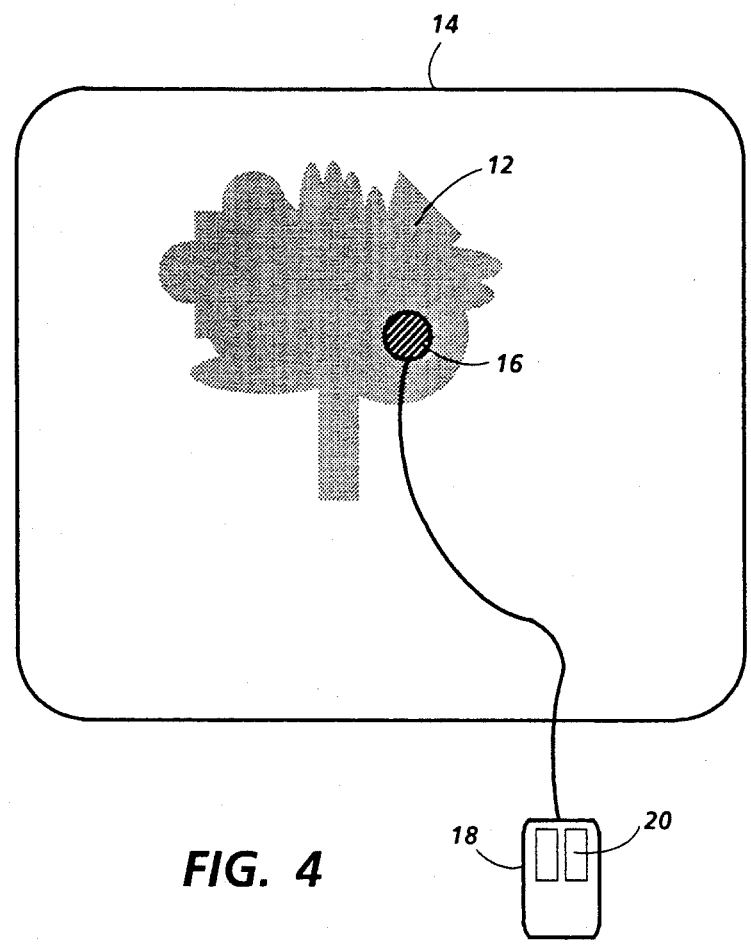

FIG. 4 illustrates the relationship of the image, airbrush, and control device in accordance with the present invention.

The digital image is shown on a display CRT where each pixel is represented by a certain light intensity. Any number of grey levels can be shown, for example, in one embodiment between 0 and 255. When the pointer points to a given set of pixels on the display, the system control will also point to the corresponding pixels stored in memory.

The image on the display CRT is refreshed from the image stored in memory at periodic intervals, typically 30 times per second. Therefore, whenever a change is caused in memory by enhancing contract, 1/30 of a second later, the displayed image will show these changes. The size of the brush tip (cursor pattern) displayed over the visual image can be varied by any suitable method.

In an image, increased contrast is produced by a tone reproduction curve with a slop greater than unity and decreased contrast is produced by a tone reproduction curve with a slope less than unity. According to the present invention, a local change in contrast of an image can be achieved without appreciably changing the local average intensity of the image. This is similar by analogy to unsharp masking in the graphic arts.

Thus, it is possible to decrease or increase the local contrast of an image. Decreasing the local contrast achieves an effect similar to air brushing in graphic arts, while increasing the contrast is somewhat equivalent to unsharp masking.

FIG. 1(a) illustrates linear tone reproduction curves showing output tone intensity in relation to input tone intensity. Curve X is the unity curve wherein the output intensity equals the input intensity. Curve Y illustrates the increase in output intensity as compared to the input intensity and curve Z illustrates a decreased output intensity compared to the input intensity. The airbrush is applied to a given area of image elements or pixels. This area of pixels has an average tone intensity, say for example an intensity of 20. In accordance with the present invention, the tone reproduction curve is centered at the average intensity level to keep the same average intensity, yet to allow a different contrast.

By changing the slope of the tone reproduction curve, the degree of contrast change can be increased or decreased. However, in practice, curves differing only slightly from unity are predetermined and stored in memory. This small change in contrast value is made at the area covered by the airbrush for each activation of the air brush. Thus, to provide greater gradient between tone levels or a greater contrast, it is only necessary to successively activate the airbrush. It should also be noted that although a specific embodiment described relates to intensity space, the same technique and principle would apply to tone levels in a density space.

Figure 2A:
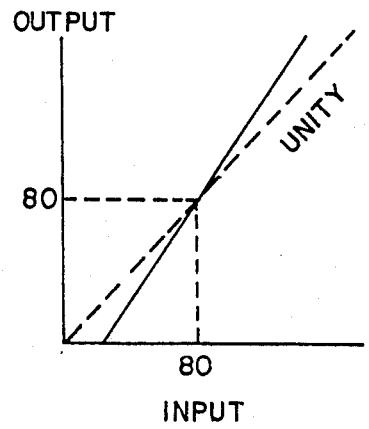
Figure 2B:
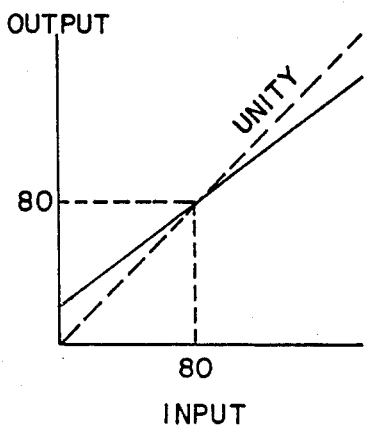

In operation, a signal indicating that airbrushing is to be initiated is received by the control. In addition, a signal is provided whether or not to increase or decrease the contrast. Upon receipt of these signals, the average value of the pixels in the defined area of area to be covered is determined. A tone reproduction curve lookup table of slope greater than unity (for increased contrast) or slope less than unity (for decreased contrast) is created or retrieved from the memeory. This curve crosses the unity slope curve at the computed average value of the pixels. FIGS. 2(a) and 2(b) illustrate a tone reproduction curve fitted for a local average intensity of 80, positioned to cross the unity curve at 80.

Figure 2C:
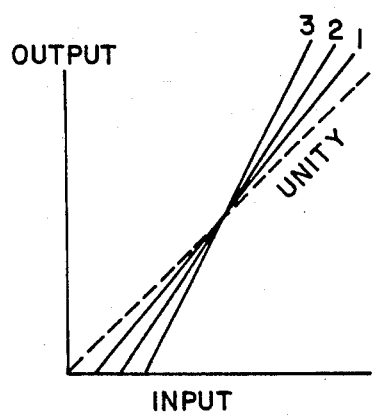
Figure 2D:
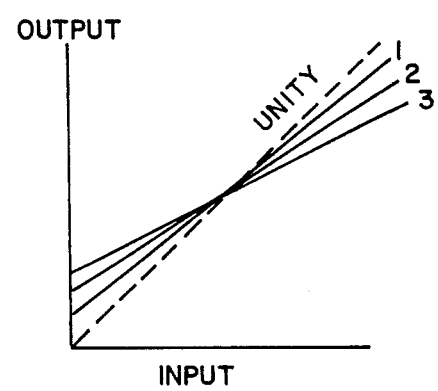

Each time the airbrush is activated, the pixels in the area defined by the cursor are changed according to the existing tone reproduction curve. If the cursor is not moved, and the digital airbrush is pressed repeatedly, the effect is that of incrementally increasing or decreasing the tone reproduction curve slope. This is illustrated in FIGS. 2(c) and 2(d). The numbered areas illustrate the resulting tone reproduction curve after the air brush has been pressed once, twice and three times. For user convenience, the pixels are also changed whenever the position of the cursor changes with the airbrush activated.

Figure 2E:
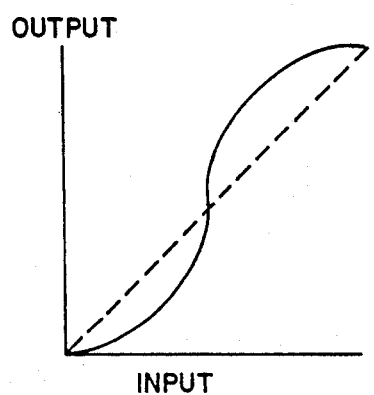
Figure 2F:
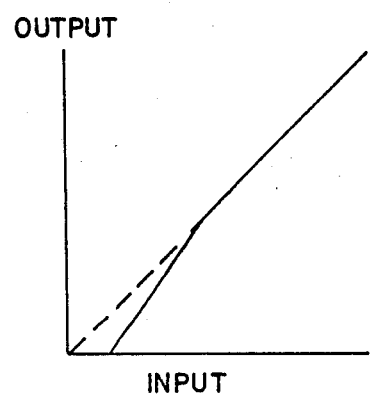
Figure 2G:
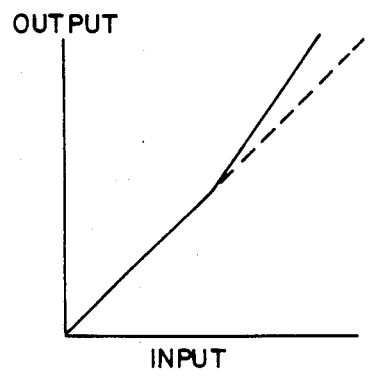

Several variances of the basic method are illustrated in FIGS. 2(e), 2(f) and 2(g). When the airbrush is activated repeatedly, some of the pixels in the area may saturate (become black or white) too fast. This effect can be lessened by making the tone reproduction curve nonlinear. With a greater slope near the average value point and a smaller slope towards the two ends of the curve, this effect can be achieved as shown in FIG. 2(e). The contrast of only the dark or light pixels (as compared to the average value) can be affected by creating a tone reproduction curve whose slope is different from unity only below or above the average value as seen in FIGS. 2(f) and 2(g).

With reference to FIGS. 3(a) and 3(b), there is illustrated an arbitraty line or cut through a displayed image showing a change in local detail in an otherwise slowly changing intensity gradient. FIGS. 3(a) shows a local intensity pattern illustrated by the sine wave. FIG. 3(b) shows the local intensity pattern with a change in contrast without changing the local average intensity as illustrated by the increased amplitude sine wave at the same reference level. With reference to FIG. 4, there is shown an image 12 displayed on screen 14. A digital airbrush, illustrated at 16 and electrically connected to "mouse" or any other suitable cursor moving device 18, is moved across the image 12 by movement of the device 18 along any suitable surface. Activation of any suitable switch 20 on the device 18 will cause the portion of the image 12 underlying the airbrush 16 to be modified as illustrated in FIGS. 3a and 3b, the contrast of the image in this case being increased in proportion to the sine wave amplitudes in FIGS. 3a and 3b.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

I claim:

1. An digital image processing method comprising creating a visual image on a display device from continuous tone raster image signals representative of a continuous tone raster image with each signal having a value between a minimum and a maximum level related to the tone level of a pixel within the raster image, creating on the display device an airbrush tip image over a limited area of a visual image and enabling the location of the airbrush tip image to be moved relative to a visual image in response to movement of a pointer device by a viewer of the images and touching up the one levels of the continuous tone raster image signals by modifying the contrast of the raster image signals corresponding to the signals creating the visual image under the airbrush tip image in response to moving the airbrush tip image over the visual image by moving the pointer.

2. The method of claim 1, wherein the step of modifying the contrast includes the step of gradually increasing one tone level and decreasing another tone level in given increments and including the step of maintaining a constant average level intensity of said limited area.

3. In a digital image processing sytem having a digital image including a plurality of pixels, the method of changing the contrast of the digital image comprising the steps of:

isolating a portion of the plurality of pixels, said portion have a given average intensity level, selectively altering the tone levels between pixels within said portion of the plurality of pixels, and maintaining a constant average level intensity for said portions.

4. The method of claim 3, including the step of altering tone levels in small increments.

5. The method of claim 3, including the step of determining the average tone values of pixels within said portion.

6. The method of claim 5, including the step of generating a tone reproduction curve look-up table at a slope greater than unity.

7. The method of claim 5, including the step of generating a tone reproduction curve look-up table at a slope less than unity.

8. The method of claim 6 or 7, including the step of determining a unity tone reproduction curve and the step of determining the point on the unity tone reproduction curve where the tone reproduction curve different from unity intersects the unity reproduction curve.

* * * * *